United States Patent
Roeck (10) Patent No.: US 8,622,493 B2
(45) Date of Patent: Jan. 7, 2014

(54) FURNITURE PULL-OUT

(75) Inventor: Siegfried Roeck, Hoechst (AT)

(73) Assignee: Julius Blum GmbH, Hoechst (AT)

( * ) Notice: Subject to any disclaimer, the term of this patent is extended or adjusted under 35 U.S.C. 154(b) by 0 days.

(21) Appl. No.: 13/565,017

(22) Filed: Aug. 2, 2012

(65) Prior Publication Data

US 2012/0294555 A1 Nov. 22, 2012

Related U.S. Application Data

(63) Continuation of application No. PCT/AT2011/000065, filed on Feb. 4, 2011.

(30) Foreign Application Priority Data

Feb. 5, 2010 (AT) .................................. A 167/2010

(51) Int. Cl.
*A47B 88/00* (2006.01)

(52) U.S. Cl.
USPC .................... 312/348.4; 312/330.1; 312/334.8

(58) Field of Classification Search
USPC ........ 312/402, 404, 330.1, 334.7, 334.8, 350, 312/348.4
See application file for complete search history.

(56) References Cited

U.S. PATENT DOCUMENTS

| | | | |
|---|---|---|---|
| 2,950,158 A * | 8/1960 | Harmon | 312/334.14 |
| 3,524,692 A | 8/1970 | Preston | |
| 3,528,718 A * | 9/1970 | Johnson et al. | 312/308 |
| 4,173,380 A * | 11/1979 | Dupree | 312/330.1 |
| 4,690,469 A * | 9/1987 | Grass | 312/330.1 |
| 4,802,716 A * | 2/1989 | Rock et al. | 312/330.1 |
| 4,872,735 A * | 10/1989 | Rock et al. | 312/334.21 |
| 4,960,307 A * | 10/1990 | Nelsen | 312/194 |
| 4,995,683 A * | 2/1991 | Albiez | 312/348.4 |
| 5,251,975 A | 10/1993 | Braun et al. | |
| 5,350,229 A * | 9/1994 | Smed | 312/334.23 |
| 5,364,180 A * | 11/1994 | Berger | 312/334.14 |
| 5,634,702 A * | 6/1997 | Fistonich | 312/270.3 |
| 5,785,402 A * | 7/1998 | DeLorenzo | 312/350 |
| 5,938,305 A * | 8/1999 | Rubsam-Tomlinson | 312/270.1 |
| 6,135,584 A * | 10/2000 | Happ | 312/330.1 |
| 7,028,503 B2 * | 4/2006 | Lyvers et al. | 62/344 |
| 2002/0024276 A1 | 2/2002 | Neuhaus | |
| 2007/0159039 A1 | 7/2007 | Lam et al. | |
| 2010/0084954 A1 | 4/2010 | Schneider et al. | |
| 2011/0163647 A1* | 7/2011 | Hartl | 312/334.7 |

FOREIGN PATENT DOCUMENTS

| | | | |
|---|---|---|---|
| AT | 407333 B | * | 1/2001 |
| AT | 007533 U1 | * | 5/2005 |
| AT | 506783 B1 | * | 12/2009 |

(Continued)

OTHER PUBLICATIONS

Machine translation of DE 3516547 A1, Nov. 1986.*

(Continued)

*Primary Examiner* — Hanh V Tran (74) *Attorney, Agent, or Firm* — Wenderoth, Lind & Ponack, L.L.P.

(57) ABSTRACT

A movable furniture pull-out for a piece of furniture includes a side wall arranged between a rear wall and a front panel, and a rail that is arranged between the rear wall and the front panel. The rail is arranged below the side wall.

22 Claims, 9 Drawing Sheets

(56) References Cited

FOREIGN PATENT DOCUMENTS

| | | | |
|---|---|---|---|
| CN | 100998465 | | 7/2007 |
| CN | 101674755 | | 3/2010 |
| CN | 102113777 | | 7/2011 |
| DE | 3516547 | A1 * | 11/1986 |
| DE | 295 07 322 | | 7/1995 |
| DE | 44 16 237 | | 10/1995 |
| DE | 19830740 | A1 * | 1/2000 |
| DE | 20 2005 006 862 | | 7/2005 |
| DE | 20 2005 006 952 | | 8/2006 |
| EP | 124059 | A * | 11/1984 |
| EP | 442288 | A * | 8/1991 |
| EP | 0 702 914 | | 3/1996 |
| EP | 1 136 392 | | 9/2001 |
| EP | 1 364 894 | | 11/2003 |
| EP | 1 716 779 | | 11/2006 |
| EP | 1 716 780 | | 11/2006 |
| EP | 2 340 743 | | 7/2011 |
| WO | WO 9207494 | A1 * | 5/1992 |

OTHER PUBLICATIONS

Machine translation of DE 4416237 A1, Oct. 1995.*
Machine translation of DE 19830740 A1, Jan. 2000.*
Machine translation of EP 0124059 A, Nov. 1984.*
Machine translation of EP 0442288 A, Aug. 1991.*
Machine translation of EP 1364894 A1, Nov. 2003.*
Machine translation of EP 1716779 A1, Nov. 2006.*
International Search Report issued Apr. 6, 2011 in International (PCT) Application No. PCT/AT2011/000065.
Austrian Patent Office Search Report completed Dec. 1, 2010 in Austrian Patent Application No. A 167/2010.

* cited by examiner

FURNITURE PULL-OUT

This application is a Continuation of International Application No. PCT/AT2011/000065, filed Feb. 4, 2011, the entire disclosure of which is incorporated herein by reference.

BACKGROUND OF THE INVENTION

The invention concerns a movable furniture extension arrangement for an article of furniture comprising a side wall arranged between a rear wall and a front panel and a rail bar arranged between the rear wall and the front panel.

The invention also concerns an article of furniture comprising a movable furniture extension arrangement.

Furniture extension arrangements which are movable in that way are already known in large numbers. In those arrangements, the side walls of the furniture extension arrangement usually do not extend over its entire height. Thus, the front panel is only partly supported by the side wall. For that reason it is already known to fit rail bars to enhance the stability of the front panel.

SUMMARY OF THE INVENTION

The object of the invention is to provide a stable movable furniture extension arrangement. That is achieved by the movable furniture extension arrangement according to the invention in that the rail bar is arranged beneath the side wall and below the rail system.

Arranging the rail bar beneath the side wall makes it possible for the side wall to be arranged in the upper region of the furniture extension arrangement while the stability of the front panel is increased by arranging the rail bar beneath the side wall.

Especially in the case of movable furniture extension arrangements which serve to store articles which can be removed in hanging relationship—like for example in the case of garbage separation systems—stability must be afforded especially in the upper region of the furniture extension arrangement as the highest force action is to be found at that region. In order nonetheless to ensure stability for the front panel, the rail bar is arranged beneath the side wall.

Further advantageous embodiments of the invention are defined in the appendant claims.

It has proven to be particularly advantageous if the rail bar has an adjusting device by which the front panel can be inclined. An adjusting device makes it possible to orient the front panel on the furniture carcass, which is necessary in particular when there are tolerances in the positions of the guide system and as a result the front panel is inclined away from the furniture carcass or moves towards it in the upper region or even strikes against it.

In a preferred embodiment, the adjusting device can be adapted so that it changes the effective length of the rail bar. The rail bar is supported on the one hand at the front at the inside of the front panel, and on the other hand at the rear at the rear wall. A variable-length rail bar makes it possible to easily influence the inclination of the front panel.

It can further preferably be provided that the side wall is provided at least partially and preferably substantially completely above the rail system. A rail system affords a convenient and comfortable option for displacing the movable furniture extension arrangement out and in. By virtue of the arrangement of the side wall above the rail system, the side wall can be supported at the rail system and this arrangement therefore contributes to a stable system.

Preferably, the furniture extension arrangement can have a receiving device—preferably for a storage system for garbage separation—, wherein the—preferably frame-shaped—receiving device is provided at least partially, preferably substantially completely, above and/or at least partially between two side walls of the furniture extension arrangement. By virtue of the receiving device being mounted above the side walls, it can be easily hung in position, or the positioning of the receiving device between the two side walls provides for a stable system for the movable furniture extension arrangement.

In that respect, it has proven to be particularly advantageous if the furniture extension arrangement has a storage system for garbage separation, wherein the storage system can be releasably fixed to the receiving device, preferably without a tool. Garbage separation systems are especially highly suited to be arranged releasably fixably on the receiving device as they often have to be removed for emptying thereof.

In a preferred embodiment, the storage system can be arranged hangingly in the receiving device and the receiving containers can be removed substantially perpendicularly from the receiving device when the furniture extension arrangement is pulled out. Perpendicular removal can be easily effected by a user, and a practicable working procedure can thus be achieved.

It has further proven to be advantageous if the rear wall of the furniture extension arrangement is arranged spaced apart from the rear end of the furniture extension arrangement. A rear wall which is displaced forwardly in the direction of the front panel can prevent the storage system being disposed too far in the rear region of the furniture extension arrangement whereby easy removal would be impeded.

It has proven to be advantageous if the rear wall of the furniture extension arrangement is arranged spaced apart from the rear end of the rail system, preferably a drawer rail of the rail system. That makes it possible for rail systems which already belong to the state of the art to be used in such a furniture extension arrangement.

It can further preferably be provided that the rear wall of the furniture extension arrangement is arranged displaced forwardly at a spacing from the rear edges of the side walls of the furniture extension arrangement. In that way, it is possible that side walls already belonging to the state of the art can be fitted to this furniture extension arrangement.

In a possible embodiment, fitment portions—preferably made from plastic material—can be provided to connect the rear wall to—preferably the rear edges of—the side walls—preferably without the use of a tool and/or releasably. That makes it possible for the rear wall to be easily mounted to the side walls by the fitment portions while at the same time making it possible to arrive at a reduced spacing of the rear wall relative to the front panel by way of those fitment portions.

In a preferred embodiment, the rear wall of the furniture extension arrangement can be in one piece or the rear wall of the furniture extension arrangement can have two or more rear wall portions. The rear wall portions respectively extend from side wall towards side wall. Because the rear wall or the rear wall portions respectively extend over the entire width, it is possible to produce a stable structure.

Desirably, a furniture drive can be arranged behind the rear wall or a rear wall portion of the furniture extension arrangement. In that way such a furniture extension arrangement can also be driven.

In specific terms, the invention is also directed to an article of furniture comprising a movable furniture extension arrangement of the described embodiments.

BRIEF DESCRIPTION OF THE DRAWINGS

Further details and advantages of the present invention will be described more fully hereinafter by the specific description with reference to the embodiments illustrated in the drawings, in which:

FIG. 2 shows a side view in section through an article of furniture with furniture extension arrangement moved in.

DETAILED DESCRIPTION OF THE INVENTION

Figure 1:
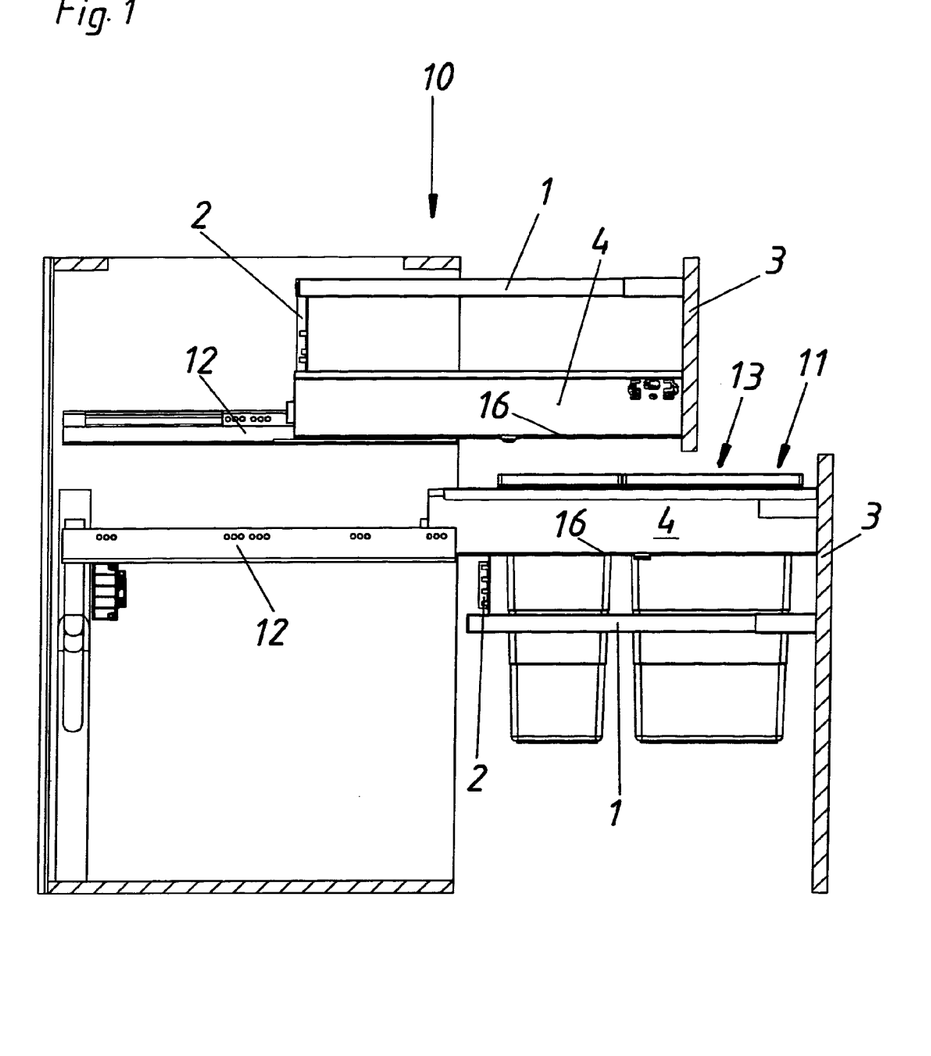
FIG. 1 shows a side view in section through an article of furniture with furniture extension arrangement pulled out.

FIG. 1 shows a side view in section through an article of furniture 10. Arranged in the upper part of the article of furniture 10 is a drawer in accordance with the state of the art, and the drawer is movably arranged by way of a drawer rail 16 of a rail system 12 in the article of furniture 10 or its furniture carcass 17. That drawer in accordance with the state of the art is equipped with a rail bar 1, side walls 4, a rear wall 2 and a front panel 3. In this arrangement, the front panel 3 can be changed in its inclination relative to the furniture carcass 17 by means of the rail bar 1.

Arranged in the lower region of the article of furniture 10 is the movable furniture extension arrangement 11 which is movably arranged on the rail system 12 by way of drawer rails 16. In this case, the furniture extension arrangement 11 also has side walls 4, a rear wall 2, a front panel 3 and a rail bar 1 with the difference in relation to the state of the art that the rail bar 1 is arranged below the side wall. That provides a stable furniture extension arrangement 11 for side walls 4—mounted in the upper region—which have to receive a storage system 13.

In this case the front panel 3 extends both to below the side wall 4 and also to below the rail bar 1.

Figure 2:
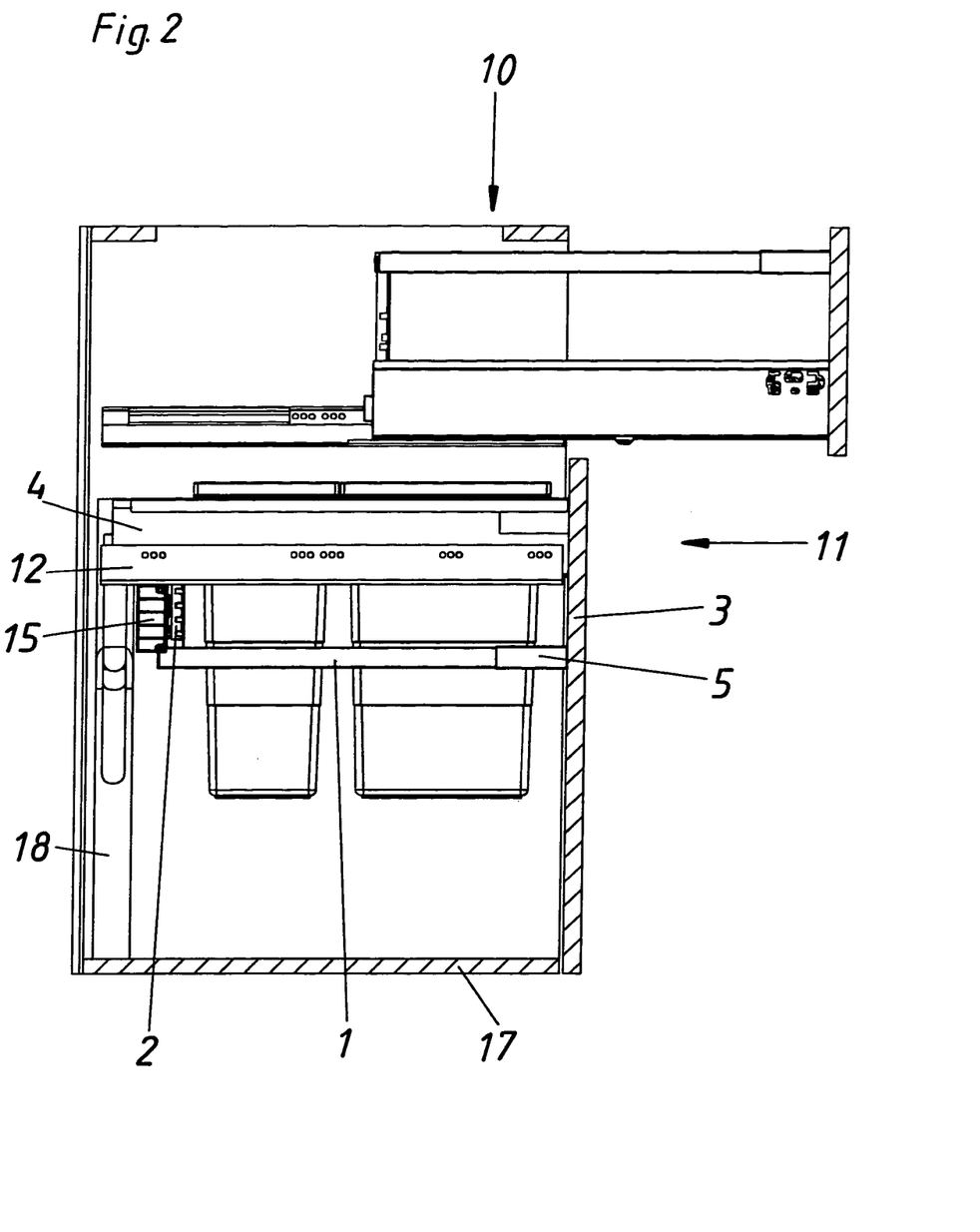

FIG. 2 shows a section through the side view of an article of furniture 10, in which the movable furniture extension arrangement 11 is in the retracted position. The inclination of the front panel 3 can be altered by the adjusting device 5 and thus oriented to the furniture carcass 17, by means of the rail bar 1. In this case, the length of the rail bar 1 which is supported on the one hand at the inside of the front panel 3 and on the other hand at the rear at the rear wall 2 is altered by the adjusting device 5.

In this case, the rear wall 2 of the furniture extension arrangement 11 is spaced from the rear end of the rail system 12, with the result that both a discharge flow system for a washbasin 18 can be arranged behind the furniture extension arrangement 11 in the article of furniture 10 and also a furniture drive 15 for automatic movement of the furniture extension arrangement 11 has space behind the rear wall 2 and in front of the discharge flow system 18.

Figure 3:
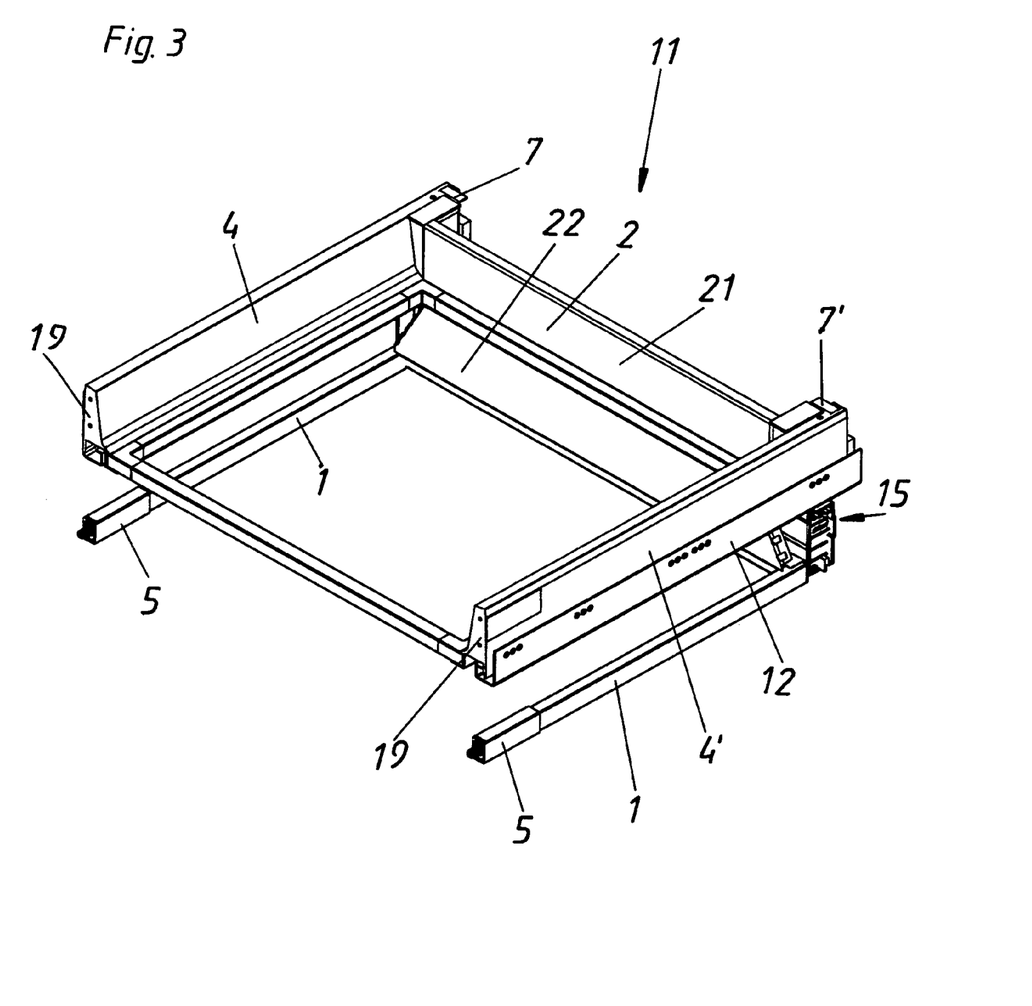
FIG. 3 shows a perspective view of a furniture extension arrangement.

FIG. 3 shows a movable furniture extension arrangement 11 as is arranged in the usual manner in an article of furniture 10 (not shown here) or its furniture carcass 17 (not shown). This view also does not show the front panel 3 of the furniture extension arrangement 11. That front panel 3 is arranged in the usual fashion at the ends of the side walls 4, 4' by way of the fixing devices 19 on the furniture extension arrangement 11. The furniture extension arrangement 11 also has the rail bars 1 and the adjusting devices 5 which are disposed thereon and which are between the front panel 3 and the rear wall 2. The effective length of the rail bars 1 can be changed by way of the adjusting devices 5, with the result that the front panel 3 can be inclined and thus oriented on the furniture carcass 17.

This furniture extension arrangement 11 is arranged on a rail system 12, by way of which the furniture extension arrangement 11 can be moved horizontally out of the article of furniture 10 or the furniture carcass 17.

The side walls 4, 4' are arranged in the upper region of this furniture extension arrangement 11 as they are intended to receive a hanging storage system 13. For that purpose, a high level of stability is desired—especially in the upper region of the furniture extension arrangement 11. In that respect, to enhance the stability of such a furniture extension arrangement 11, the rail bars 1 are arranged below the side walls 4, 4'. In that case, the rail bars 1 can be altered in their effective length by the adjusting devices 5, in which case the rail bars 1 are supported on the one hand at the front at the inside of the front panel 3 and on the other hand at the rear at the rear wall 2. That change in length of the rail bars 1 leads to tilting of the front panel 3 whereby the front panel 3 can be arranged parallel at the front side of the furniture carcass 17.

In this embodiment, the side walls 4, 4' are arranged substantially over the rail system 12 whereby rail systems 12 already belonging to the state of the art and their drawer rails 16 (not shown) can be used for this specific furniture extension arrangement 11. The rail bars 1, in contrast, are arranged below the rail system 12 (and side walls 4, 4') whereby—by that distribution of the side walls 4, 4' above the rail system 12—and the rail bars 1 below the rail system 12, this affords an extremely stable construction for a furniture extension arrangement 11.

In this case, the rear wall 2 of the furniture extension arrangement 11 is spaced from (in front of) the rear end of the furniture extension arrangement 11. Thus, for example, a discharge flow system 18 (not shown) can extend behind the rear wall 2, and the assembly ensures that the furniture extension arrangement 11 can be moved completely into the furniture carcass 17.

In this case, the rear wall 2 of the furniture extension arrangement 11 is also spaced from the rear end of the rail system 12 or the drawer rail 16 of the rail system 12, which causes the positive effect that a rail system belonging to the state of the art can be used and nonetheless a spacing of the rear wall 2 relative to the rear side of the furniture carcass 17 is afforded.

Likewise, the rear wall 2 of the furniture extension arrangement 11 can be arranged displaced forwardly at a spacing from the rear edges of the side walls 4, 4' of the furniture extension arrangement 11, with the result that side walls 4, 4' already belonging to the state of the art can also be used.

In that respect, fitment portions 7, 7' are used, which arrange the rear wall 2 in displaced relationship with the rear edges of the side walls 4, 4'. In this embodiment, those fitment portions 7, 7' are made of plastic or metal and can be arranged on the rear wall 2 or the side walls 4, 4' respectively without the use of a tool.

In this embodiment, the rear wall 2 is in one piece, wherein a furniture drive 15 (not shown) can have space behind the lower region of the rear wall 2. That rear wall 2 could likewise comprise a plurality of rear walls portions 21, 22 if that provides advantages in terms of production engineering. Here, the rear wall 2 is in one piece and extends in the upper region without interruption from a side wall 4 to the second side wall 4' and in the lower region from a rail bar 1 to the second rail bar 1. The stability of the overall structure is increased by that interruption-free connection.

Figure 4:
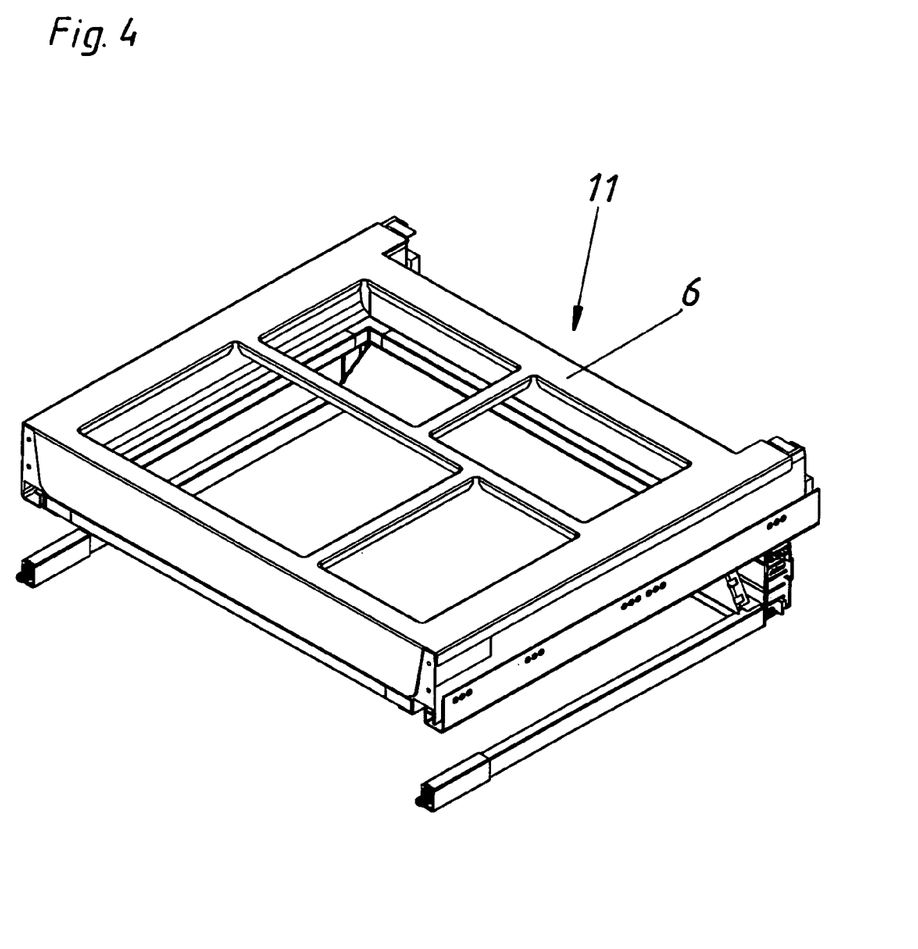
FIG. 4 shows a perspective view of a furniture extension arrangement with a receiving device.

FIG. 4 shows a furniture extension arrangement 11 as described with reference to FIG. 3, wherein a frame-shaped receiving device 6 is already fitted thereon without the use of a tool.

Figure 5:
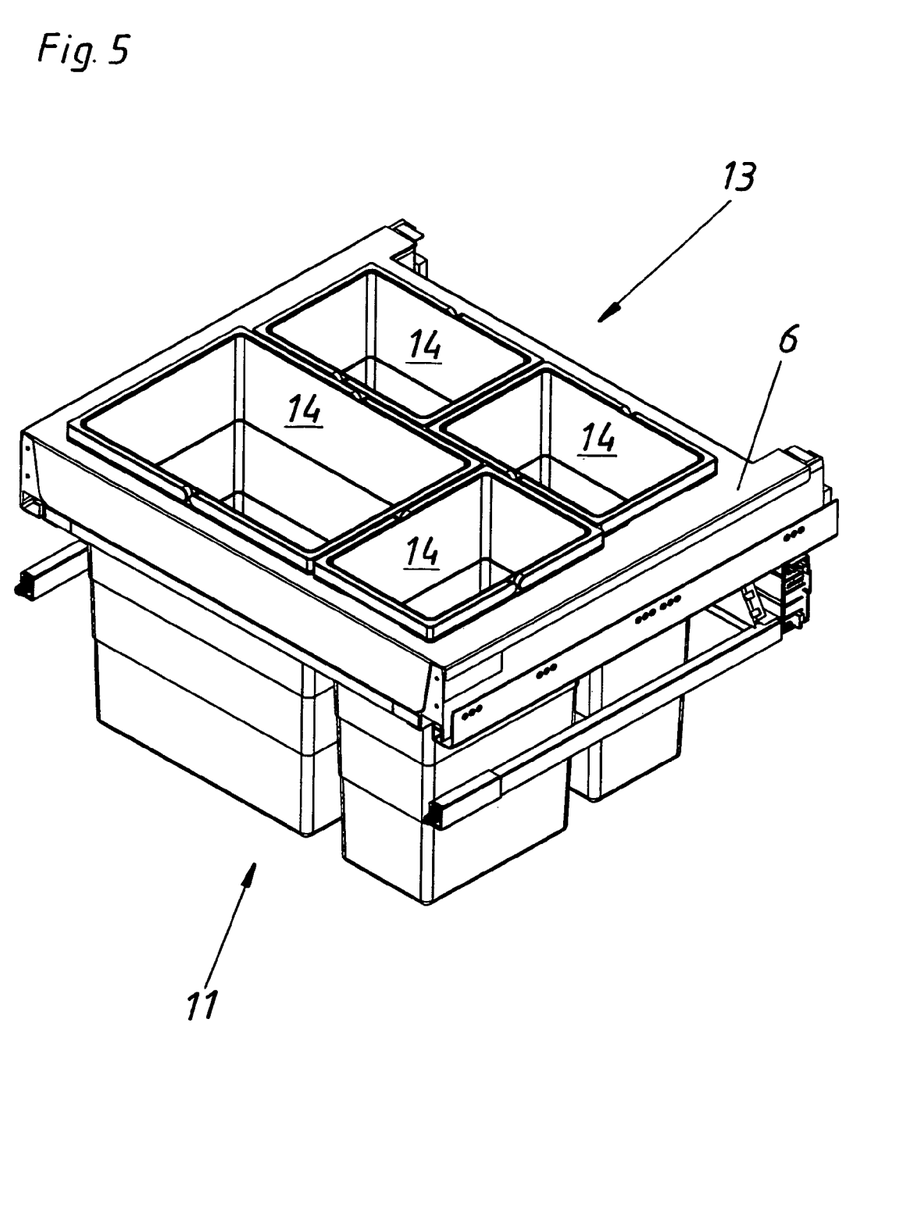
FIG. 5 shows a perspective view of a furniture extension arrangement with a receiving device and a storage system.

As shown in FIG. 5, that receiving device 6 is intended for receiving a storage system 13. In this case, the storage system 13 has four storage containers 14 which can be removed releasably and without a tool upwardly from the receiving device 6. That is equally possible with the furniture extension arrangement 11 fully pulled out (see FIG. 8).

Figure 6:
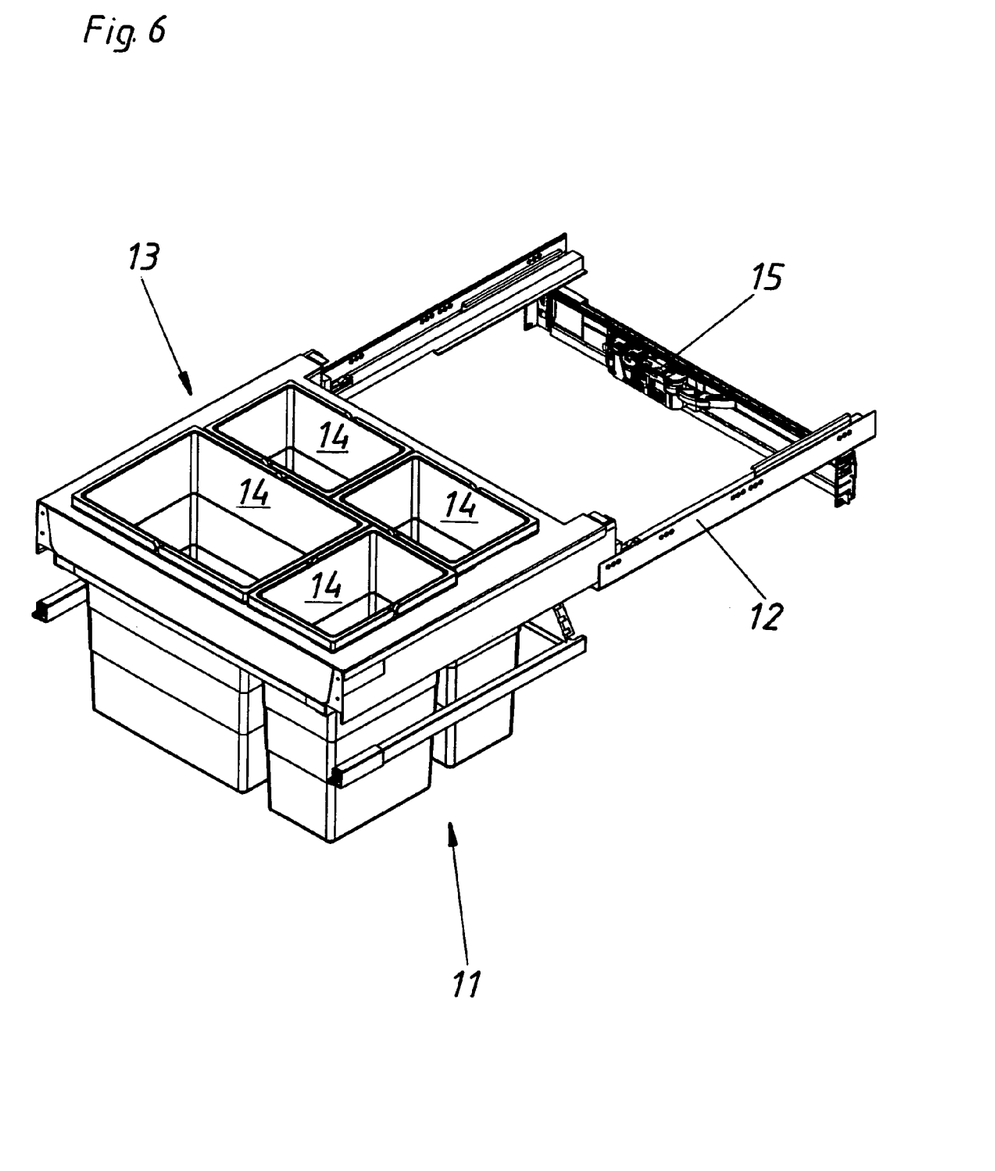
FIG. 6 shows a perspective view of a pulled-out furniture extension arrangement with storage system.

FIG. 6 shows the furniture extension arrangement 11 as just described with reference to FIG. 5, in which case here it is now in its second maximum position—fully pulled-out—. In this position it is possible to see the furniture drive 15 which serves for motor-driven horizontal movement of the furniture extension arrangement 11.

Figure 7A:
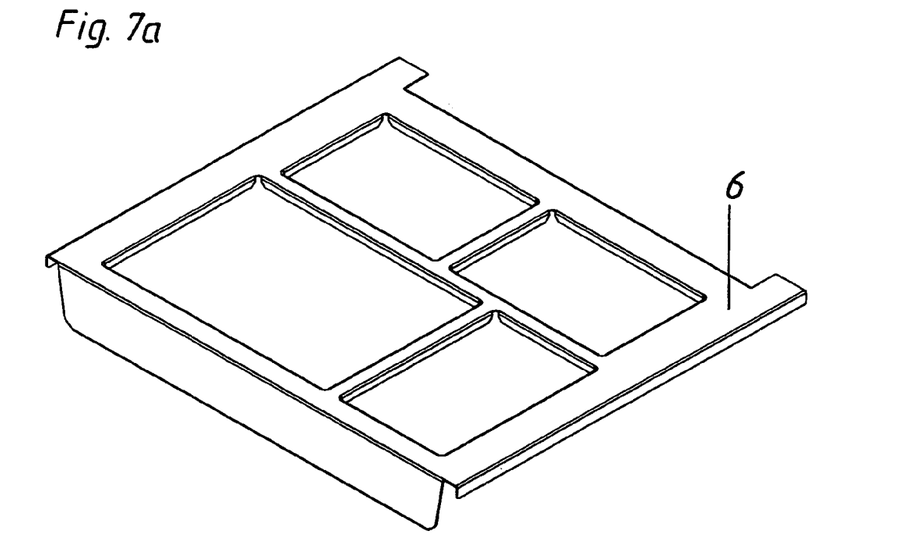
FIG. 7a shows a perspective view of a receiving device.
Figure 8:
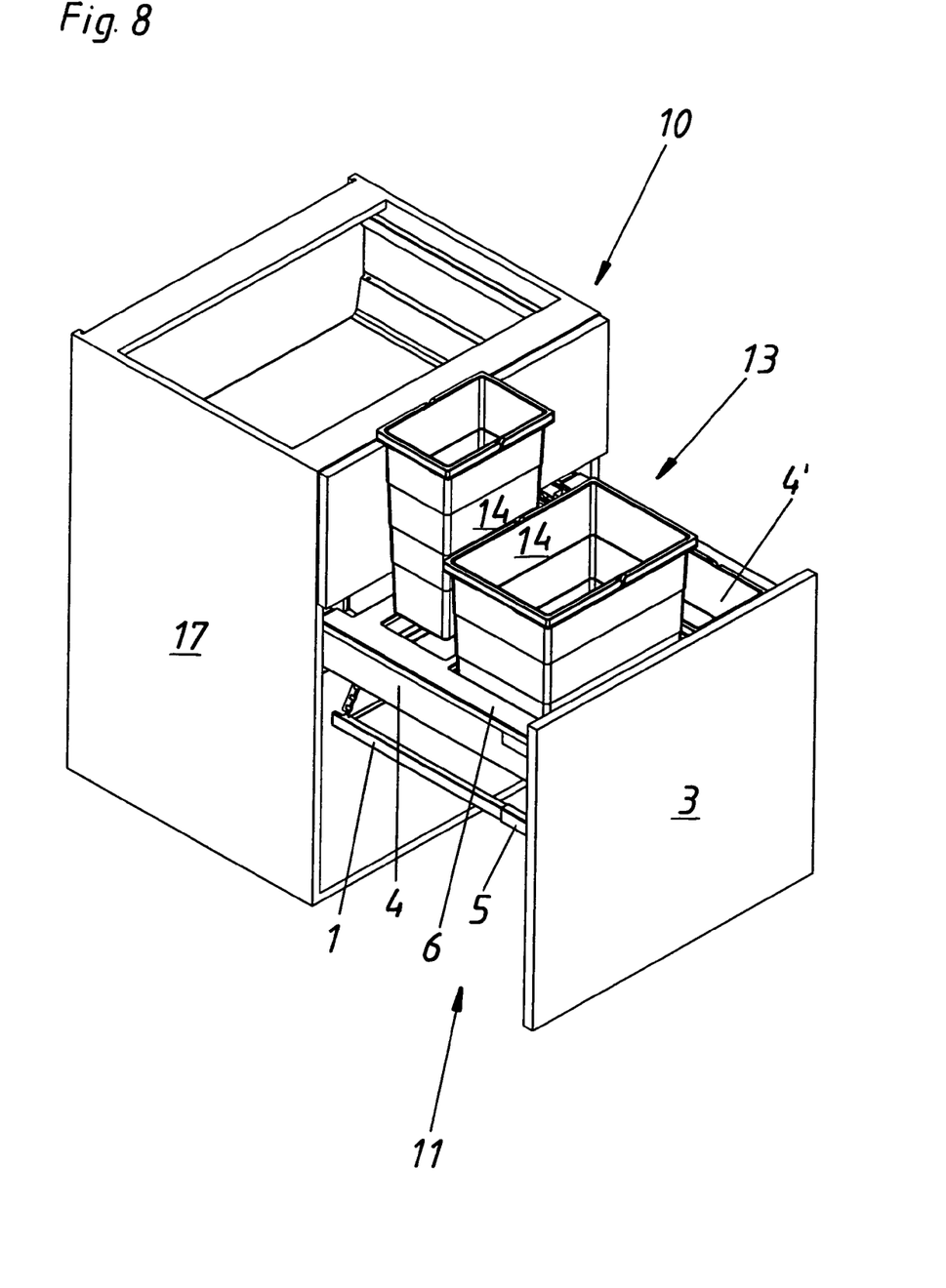
FIG. 8 shows a perspective view of an article of furniture with pulled-out furniture extension arrangement.

FIG. 7a shows the frame-shaped receiving device 6 which is preferably made in one piece and which serves to receive in hanging relationship the storage containers 14 (not shown) of the storage system 13 (not shown) (see FIGS. 5 and 8).

Figure 7B:
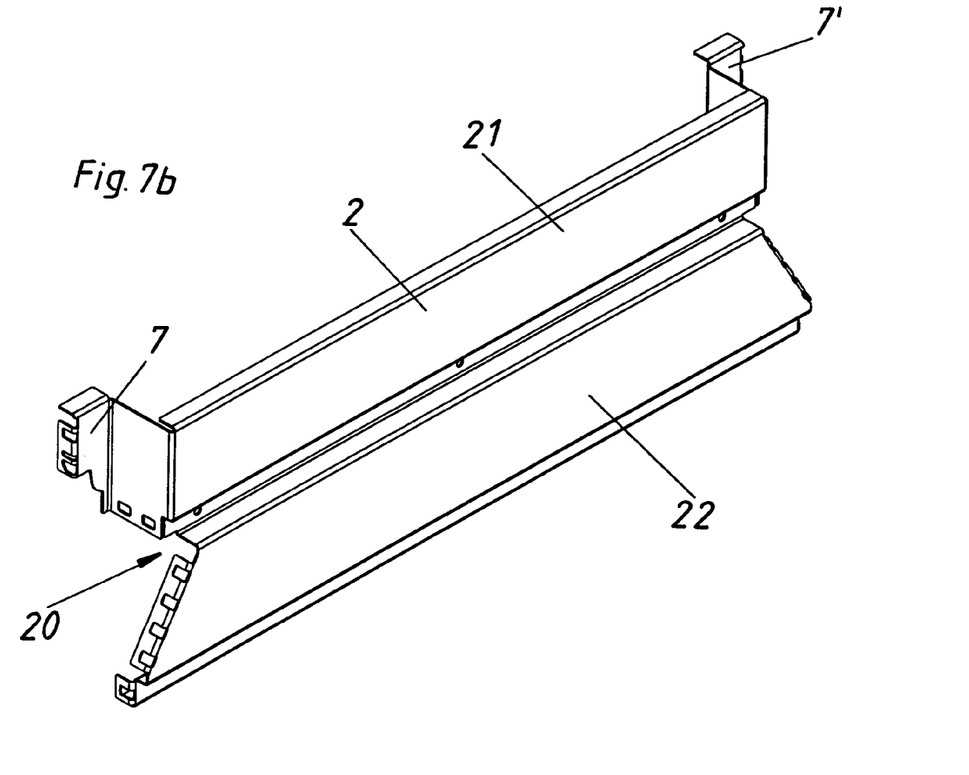
FIG. 7b shows a perspective view of a rear wall.

FIG. 7b shows the rear wall 2, on which are arranged at left and right the two fitment portions 7, 7' by way of which the rear wall 2 can be releasably connected without a tool to the side walls 4, 4' (not shown here) (see FIG. 3). Arranged in the lower region of the rear wall 2 are the rail bars 1 (not shown here). In this embodiment, the rear wall 2 is in one piece and has a Z-shaped profile member 20. It would also be conceivable for the rear wall 2 to be made from two or more rear wall portions 21, 22.

FIG. 8 shows an article of furniture 10 having a furniture carcass 17 and a furniture extension arrangement 11. The furniture extension arrangement 11 has a receiving means 6 for receiving a storage system 13 having storage containers 14. When the furniture extension arrangement 11 is pulled out, those storage containers 14 can be removed substantially perpendicularly from the receiving device 6. The rail bars 1 arranged below the side walls 4, 4' (only one rail bar 1 is visible) enhance the stability of the furniture extension arrangement 11 and further afford the capability that the front panel 3 can be inclined by way of the adjusting devices 5 (only one adjusting device 5 is shown), whereby the front panel 3 can be oriented relative to the furniture carcass 17.

Figure 9:
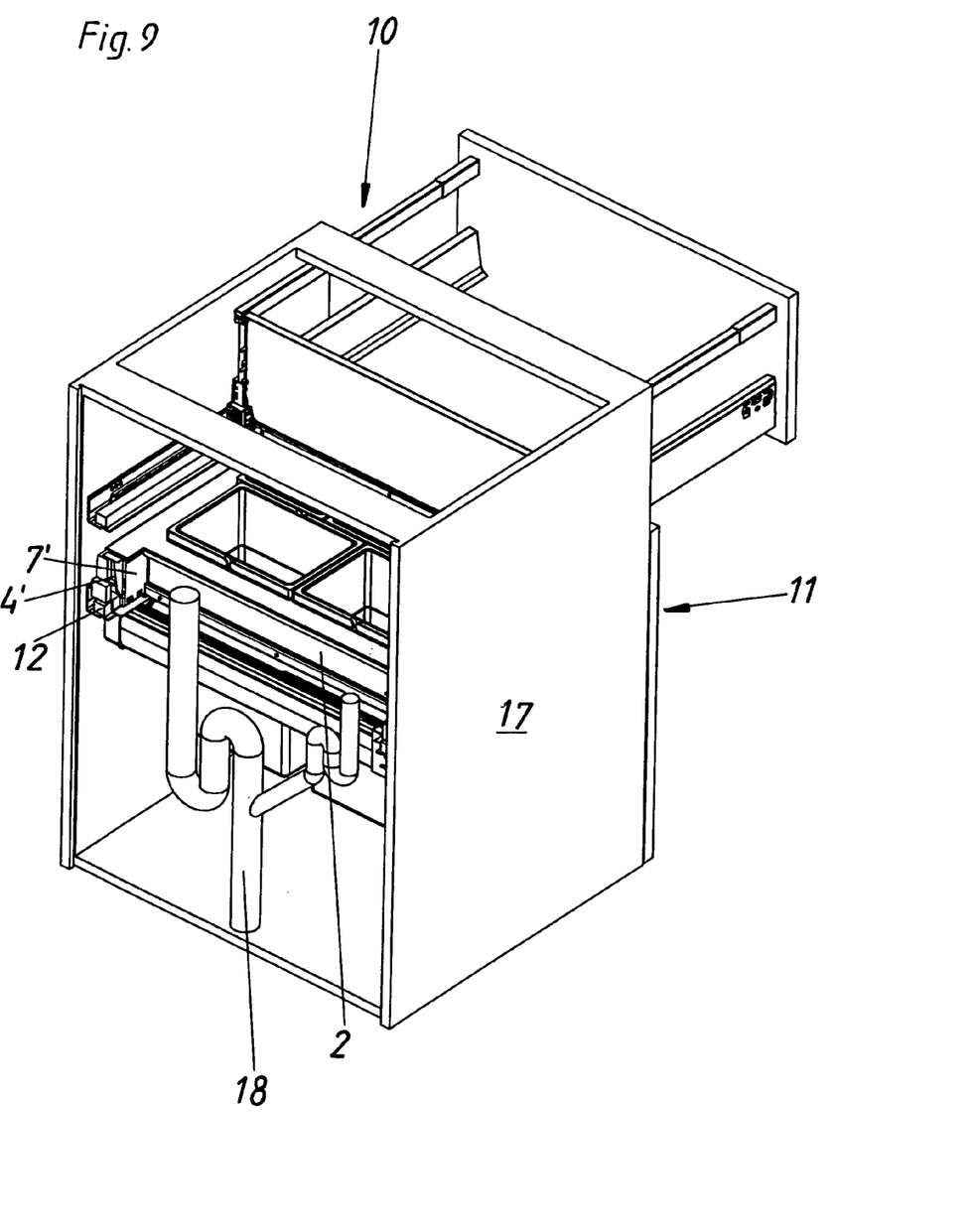
FIG. 9 shows a perspective rear view of an article of furniture.

FIG. 9 shows a perspective rear view of an article of furniture 10 with a furniture extension arrangement 11, the furniture extension arrangement 11 being in its fully retracted condition in the furniture carcass 17. Because the rear wall 2 is spaced from the rear end of the rail system 12 or the rear end of the side walls 4, 4' (side wall 4 not visible), it is thus possible that a discharge flow system 18 or the like can extend behind the furniture extension arrangement 11. That spacing of the rear wall 2 from the rail system 12 or the side walls 4, 4' is achieved by the fitment portions 7, 7' (fitment 7 not visible).

Even if the invention has been specifically described by means of the illustrated embodiment by way of example, it will be appreciated that the subject of the application is not limited to this embodiment. Rather it will be self-evident that features and modifications which serve to carry the concept of the invention into practice are certainly conceivable and desired.

The invention claimed is:

1. A device comprising:
    a movable furniture extension arrangement including:
        a rear wall;
        a front panel;
        a side wall arranged between said rear wall and said front panel; and
        a rail bar having a first end connected to said front panel and a second end connected to said rear wall so that said rail bar extends between said rear wall and said front panel; and
    a rail system for allowing movement of said furniture extension arrangement;
    wherein said rail bar is located below said side wall and below said rail system, wherein said rail bar has an adjusting device configured to change an effective length of said rail bar for inclining said front panel relative to said rail bar.

2. The device according to claim 1, wherein said first end of said rail bar being supported at an inside of said front panel, and said second end being supported at said rear wall.

3. The device according to claim 1, wherein said side wall is located at least partially above said rail system.

4. The device according to claim 3, wherein said side wall is completely above said rail system.

5. The device according to claim 1, wherein said side wall of said furniture extension arrangement comprises a first side wall, said furniture extension arrangement further including a second side wall and a receiving device, said receiving device being located at least partially above and at least partially between said first side wall and said second side wall of said furniture extension arrangement.

6. The device according to claim 5, wherein said receiving device supports a storage system for garbage separation.

7. The device according to claim 5, wherein said receiving device is frame-shaped.

8. The device according to claim 5, wherein said receiving device is provided completely above and at least partially between said first side wall and said second side wall of said furniture extension arrangement.

9. The device according to claim 5, wherein said furniture extension arrangement further includes a storage system for garbage separation, said storage system being releasably attached to said receiving device.

10. The device according to claim 9, wherein said storage system is releasably attached to said receiving device without a tool.

11. The device according to claim 5, wherein said furniture extension arrangement further includes a storage system configured to hang in said receiving device so that containers of said storage system are removed perpendicularly from said receiving device after said furniture extension arrangement has been pulled out from an article of furniture.

12. The device according to claim 1, wherein said rear wall of said furniture extension arrangement is spaced apart from a rear end of said furniture extension arrangement.

13. The device according to claim 1, wherein said rear wall of said furniture extension arrangement is spaced apart from a rear end of said rail system.

14. The device according to claim 13, wherein said rear wall of said furniture extension arrangement is spaced apart from said rear end of a drawer rail of said rail system.

15. The device according to claim 1, wherein said rear wall of said furniture extension arrangement is spaced apart in a forward direction from a rear edge of said side wall of said furniture extension arrangement.

16. The device according to claim 1, wherein said furniture extension arrangement further includes a fitment portion connecting said rear wall to said side wall.

17. The device according to claim 16, wherein said fitment portion is made from plastic material.

18. The device according to claim 16, wherein said fitment portion connects said rear wall to a rear edge of said side wall.

19. The device according to claim 16, wherein said fitment portion releasably connects said rear wall to said side wall without using a tool.

20. The device according to claim 1, wherein said rear wall of said furniture extension arrangement is formed of one or more portions, said side wall of said furniture extension arrangement comprising a first side wall, said furniture extension arrangement further including a second side wall opposite said first side wall, said rear wall extending from said first side wall to said second side wall.

21. The device according to claim 1, further comprising a furniture drive arranged behind said rear wall of said furniture extension arrangement.

22. An article of furniture comprising:
   a furniture carcass; and
      said device of claim 1 arranged in said furniture carcass.

* * * * *